(12) United States Patent
Zheng

(10) Patent No.: US 12,271,091 B2
(45) Date of Patent: Apr. 8, 2025

(54) DISPLAY DEVICE AND DISPLAY DEVICE MANUFACTURING METHOD

(71) Applicant: Wuhan China Star Optoelectronics Semiconductor Display Technology Co., Ltd., Hubei (CN)

(72) Inventor: Bingwen Zheng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 981 days.

(21) Appl. No.: 17/253,116

(22) PCT Filed: Sep. 8, 2020

(86) PCT No.: PCT/CN2020/113875
§ 371 (c)(1),
(2) Date: Dec. 17, 2020

(87) PCT Pub. No.: WO2022/007162
PCT Pub. Date: Jan. 13, 2022

(65) Prior Publication Data
US 2022/0187668 A1    Jun. 16, 2022

(30) Foreign Application Priority Data
Jul. 6, 2020   (CN) .......................... 202010639256.2

(51) Int. Cl.
*G02F 1/157* (2006.01)

(52) U.S. Cl.
CPC .................... *G02F 1/157* (2013.01)

(58) Field of Classification Search
CPC ...... G02F 1/155; G02F 1/157; G02F 2201/44; H01L 27/156; H01L 27/15; H01L 27/32; H10K 59/12; H10K 59/1201; H10K 59/50
See application file for complete search history.

(56) References Cited

U.S. PATENT DOCUMENTS

| | | | |
|---|---|---|---|
| 2010/0001307 A1* | 1/2010 | Reynolds ............... | H05B 33/04 257/E23.116 |
| 2013/0328945 A1* | 12/2013 | Kim ....................... | H10K 59/50 349/42 |
| 2014/0232960 A1* | 8/2014 | Schwartz ................ | B32B 3/30 349/12 |

(Continued)

FOREIGN PATENT DOCUMENTS

| CN | 103207494 | 7/2013 |
|---|---|---|
| CN | 103827726 | 5/2014 |

(Continued)

*Primary Examiner* — Balram T Parbadia

(57) ABSTRACT

The present invention discloses a display device and a manufacturing method thereof, the display device includes: an underlay substrate; a circuit layer disposed on a side surface of the underlay substrate; a light emitting device layer disposed on a side surface of the circuit layer away from the underlay substrate; an encapsulation layer covering a side surface of the light emitting device layer away from the circuit layer and at least one short side surface of the light emitting device layer; and an electrochromic device layer disposed on a side surface of the encapsulation layer away from the light emitting device layer.

13 Claims, 6 Drawing Sheets

(56) References Cited

U.S. PATENT DOCUMENTS

| | | | | |
|---|---|---|---|---|
| 2015/0153623 | A1* | 6/2015 | Shi | G02F 1/133512 |
| | | | | 359/275 |
| 2016/0033842 | A1* | 2/2016 | Shi | G02F 1/1333 |
| | | | | 359/275 |
| 2016/0349589 | A1* | 12/2016 | Sun | G09G 3/2003 |
| 2019/0056613 | A1* | 2/2019 | Wang | G02F 1/163 |

FOREIGN PATENT DOCUMENTS

| | | |
|---|---|---|
| CN | 106019688 | 10/2016 |
| CN | 109116613 | 1/2019 |
| CN | 208367392 | 1/2019 |
| CN | 111048565 | 4/2020 |
| CN | 111142302 | 5/2020 |
| KR | 10-2019-0078831 | 7/2019 |

* cited by examiner

DISPLAY DEVICE AND DISPLAY DEVICE MANUFACTURING METHOD

RELATED APPLICATIONS

This application is a National Phase of PCT Patent Application No. PCT/CN2020/113875 having International filing date of Sep. 8, 2020, which claims the benefit of priority of Chinese Patent Application No. 202010639256.2 filed on Jul. 6, 2020. The contents of the above applications are all incorporated by reference as if fully set forth herein in their entirety.

FIELD AND BACKGROUND OF THE INVENTION

The present invention relates to a field of display technologies, specifically relates to a display device and a display device manufacturing method.

With the development of society, people pay more and more attention to the protection of personal privacy, and the harm of privacy leakage is also increasing. At present a viewing angle of a mobile phone is basically near 180°. When a mobile phone is used, in addition the user of the mobile phone uprightly facing the display surface, other people can also clearly see display contents of the mobile phone from two opposite sides of the mobile phone in an angle of view nearly parallel to the display surface of the mobile phones. When a mobile phone is used in public, contents on the mobile phone is easily acquired by other people. Especially in today's highly developed information, mobile phones are used more and more frequently, and the contents on mobile phones become more and more important, which causes personal privacy to be easily leaked. At present, a plug-in privacy protection film on the mobile phone is used for personal privacy, such manner would lower a transmittance of a display screen and certainly influence a display effect, which influences display experience in non-public occasions, drastically increases a total thickness of the mobile phone, and easily results in damages to raise a use cost.

SUMMARY OF THE INVENTION

Technical Issue

A conventional display device has a technical issue that a plug-in privacy protection film lowers a transmittance of a display screen and certainly influences a display effect, influences display experience in non-public occasions, drastically increases a total thickness of the mobile phone, and easily results in damages to raise a use cost.

Technical Solution

An embodiment of the present invention provides a display device and display device manufacturing method configured to solve the technical issue of the conventional display device that a plug-in privacy protection film lowers a transmittance of a display screen and certainly influences a display effect, influences display experience in non-public occasions, drastically increases a total thickness of the mobile phone, and easily results in damages to raise a use cost.

To solve the above issue, in a first aspect, the present invention provides a display device, comprising:
an underlay substrate;
a circuit layer disposed on a side surface of the underlay substrate;
a light emitting device layer disposed on a side surface of the circuit layer away from the underlay substrate;
an encapsulation layer covering a side surface of the light emitting device layer away from the circuit layer and at least one short side surface of the light emitting device layer; and
an electrochromic device layer disposed on a side surface of the encapsulation layer away from the light emitting device layer.

In some embodiments of the present invention, the electrochromic device layer comprises a first electrode, electrochromic devices, and a second electrode, the electrochromic devices are electrically connected to the first electrode and the second electrode.

In some embodiments of the present invention, the electrochromic device layer further comprises a planarization layer and a protective layer, the electrochromic devices and the planarization layer are disposed on a side surface of the first electrode away from the encapsulation layer, the second electrode is disposed on a side surface of the planarization layer away from the first electrode, and the protective layer is disposed on a side of the second electrode away from the planarization layer and fully covers the electrochromic device layer.

In some embodiments of the present invention, the electrochromic device layer comprises a plurality of electrochromic devices, the electrochromic devices are distributed continuously along a first direction, and are distributed parallelly along a second direction.

In some embodiments of the present invention, the electrochromic device layer comprises a plurality of electrochromic devices, the electrochromic devices are distributed along a first direction at intervals, and are distributed parallelly along a second direction.

In some embodiments of the present invention, each of the electrochromic devices comprises at least two different statuses of transmittances, the transmittances at least comprise a transmittance T1 and a transmittance T2, wherein T1 is greater than T2.

In some embodiments of the present invention, the display device comprises a wide view angle mode and a narrow view angle mode, when the display device is in the wide view angle mode, the transmittance of the electrochromic devices is T1, and when the display device is in the narrow view angle mode, the transmittance of the electrochromic devices is T2.

In some embodiments of the present invention, a width of each of the electrochromic devices is less than or equal to 100 μm.

In a second aspect, the present invention provides a display device manufacturing method, the manufacturing method is configured to manufacture any one of the display devices in the first aspect, and comprises:
providing an underlay substrate, and manufacturing a circuit layer on a side surface of the underlay substrate;
manufacturing a light emitting device layer on a side surface of the circuit layer away from the underlay substrate;
manufacturing an encapsulation layer on a side surface of the light emitting device layer away from the circuit layer and at least one short side surface of the light emitting device layer; and
manufacturing an electrochromic device layer on a side surface of the encapsulation layer away from the light emitting device layer to obtain the display device.

In some embodiments of the present invention, the electrochromic device layer comprises a first electrode, the electrochromic devices and a second electrode, the electrochromic devices are electrically connected to the first electrode and the second electrode.

In some embodiments of the present invention, the electrochromic device layer further comprises a planarization layer and a protective layer, the electrochromic devices and the planarization layer are disposed on a side surface of the first electrode away from the encapsulation layer, the second electrode is disposed on a side surface of the planarization layer away from the first electrode, and the protective layer is disposed on a side of the second electrode away from the planarization layer and fully covers the electrochromic device layer.

In some embodiments of the present invention, the step of manufacturing the electrochromic device layer comprises:

forming a first electrode on a side surface of the encapsulation layer away from the light emitting device layer by a sputtering process;

forming electrochromic devices on a surface of the first electrode by a sputtering process and an etching process;

manufacturing a planarization layer among the electrochromic devices by using a photoresist material;

forming a second electrode on a side surface of the planarization layer away from the first electrode by a sputtering process; and manufacturing a protective layer on a side of the second electrode away from the planarization layer, wherein the protective layer fully covers the electrochromic device layer.

In some embodiments of the present invention, the electrochromic device layer comprises a plurality of electrochromic devices, the electrochromic devices are distributed continuously along a first direction, and are distributed parallelly along a second direction.

In some embodiments of the present invention, the electrochromic device layer comprises a plurality of electrochromic devices, the electrochromic devices are distributed along a first direction at intervals, and are distributed parallelly along a second direction.

In some embodiments of the present invention, each of the electrochromic devices comprises at least two different statuses of transmittances, the transmittances at least comprise T1 and T2, wherein T1 is greater than T2.

In some embodiments of the present invention, the display device comprises a wide view angle mode and a narrow view angle mode, when the display device is in the wide view angle mode, the transmittance of the electrochromic devices is T1, and when the display device is in the narrow view angle mode, the transmittance of the electrochromic devices is T2.

In some embodiments of the present invention, a width of each of the electrochromic devices is less than or equal to 100 μm.

Advantages

Compared to the conventional display device, the present invention, by adding a layer of an electrochromic device layer in the display device and changing an electrical field applied to the electrochromic device layer, achieves the electrochromic device layer switching between different transmittances, which achieves a higher transmittance in a wide view angle mode without influence to normal display of the display device and a lowered transmittance in a narrow view angle to reduce a viewing angle of the display device to achieve a privacy protection function. The modes are switched flexibly so application occasions are more extensive.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

A conventional display device has a technical issue that a plug-in privacy protection film lowers a transmittance of a display screen and certainly influences a display effect, influences display experience in non-public occasions, drastically increases a total thickness of the mobile phone, and easily results in damages to raise a use cost.

Accordingly, the embodiment of the present invention provides a display device and a display device manufacturing method which will be described in detail respectively.

Figure 1:
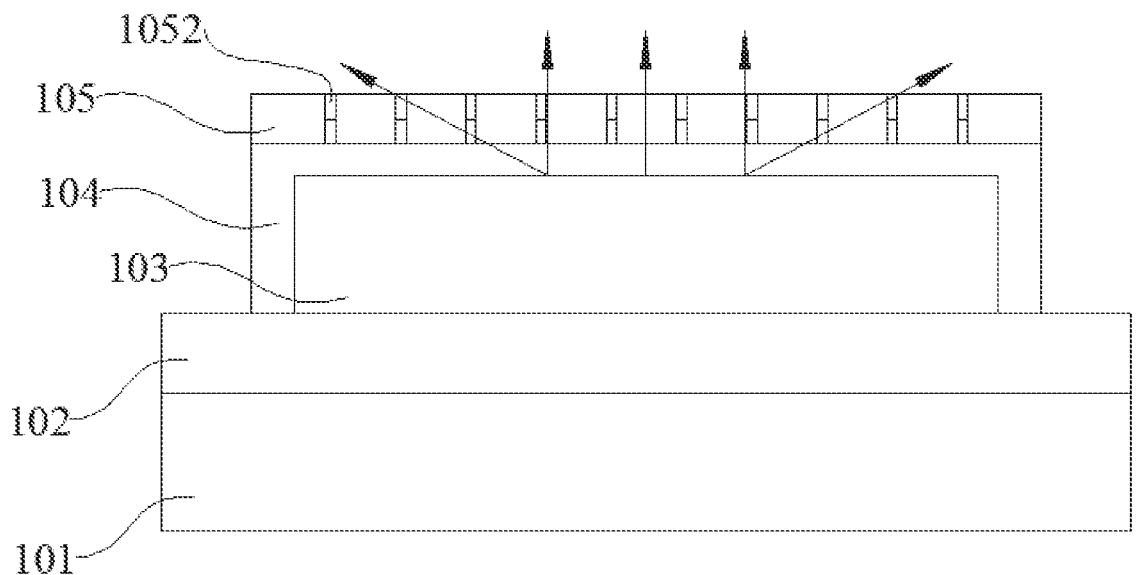
FIG. 1 is a schematic structural view of a display device of an embodiment of the present invention.

First, the embodiment of the present invention provides a display device, With reference to FIG. 1, FIG. 1 is a schematic structural view of a display device of an embodiment of the present invention. The display device comprises: an underlay substrate 101; a circuit layer 102 disposed on a side surface of the underlay substrate 101; a light emitting device layer 103 disposed on a side surface of the circuit layer 102 away from the underlay substrate 101; an encapsulation layer 104 covering a side surface of the light emitting device layer 103 away from the circuit layer 102 and at least one short side surface of the light emitting device layer 103; and electrochromic device layer 105 disposed on a side surface of the encapsulation layer 104 away from the light emitting device layer 103.

Compared to the conventional display device, the present invention, by adding a layer of an electrochromic device layer 105 in the display device and changing an electrical field applied to the electrochromic device layer 105, achieves the electrochromic device layer 105 switching between different transmittances, which achieves a higher transmittance of the electrochromic device layer 105 in a wide view angle mode without influence to normal display of the display device and a lowered transmittance of the electrochromic device layer 105 in a narrow view angle to reduce a viewing angle of the display device to achieve a privacy protection function. The modes are switched flexibly so application occasions are more extensive.

Figure 2:
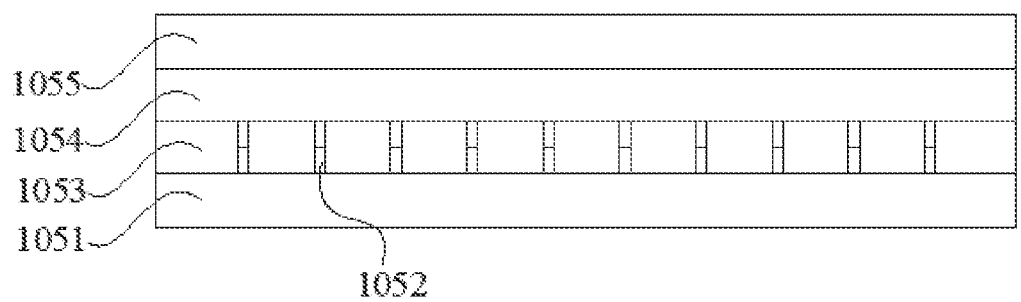
FIG. 2 is a schematic structural view of an electrochromic device layer of the embodiment of the present invention.

On the basis of the above embodiment, with reference to FIG. 2, FIG. 2 is a schematic structural view of an electrochromic device layer of an embodiment of the present invention. The electrochromic device layer 105 comprises a first electrode 1051, electrochromic devices 1052, and a second electrode 1054. The electrochromic devices 1052 is electrically connected to the first electrode 1051 and the second electrode 1054. Preferably, the underlay substrate 101 is a transparent substrate comprises at least one of glass or plastic. The circuit layer 102 further comprises a polyimide thin film, the polyimide thin film has an excellent self-support characteristic and can suppress wrinkles of the circuit layer 102 occurring during processes. The first electrode 1051 is a transparent electrode, a material of the first electrode 1051 comprises graphene or indium tin oxide. The first electrode 1051 can be a flattened electrode, and can be a pattern electrode formed by an etching process.

In another embodiment of the present invention, the electrochromic device layer 105 further comprises a planarization layer 1053 and a protective layer 1055. The electrochromic devices 1052 and the planarization layer 1053 are disposed in the same layer, and are disposed on a side surface of the first electrode 1051 away from the encapsulation layer 104, the second electrode 1054 is disposed on a side surface of the planarization layer 1053 away from the first electrode 1051. The protective layer 1055 is disposed on a side of the second electrode 1054 away from the planarization layer 1053 and fully covers the electrochromic device layer 105. Preferably, the planarization layer 1053 and the protective layer 1055 are transparent insulating materials comprising acrylic. The display device further comprises circuit pins 1056, an integrated circuit, and a control circuit. The circuit pins 1056 are located on an edge of the display panel, the electrochromic devices 1052 are connected to the control circuit through the first electrode 1051 and the second electrode 1054. The control circuit is connected to the circuit pins 1056 through lead wires such that the control circuit of the electrochromic devices 1052 is connected to the integrated circuit through the circuit pins 1056.

The electrochromic devices 1052 under the effect of the electrical field have electrochemical redox reaction such that a color of the electrochromic devices 1052 varies, namely, the transmittance of the electrochromic devices 1052 varies.

Figure 3:
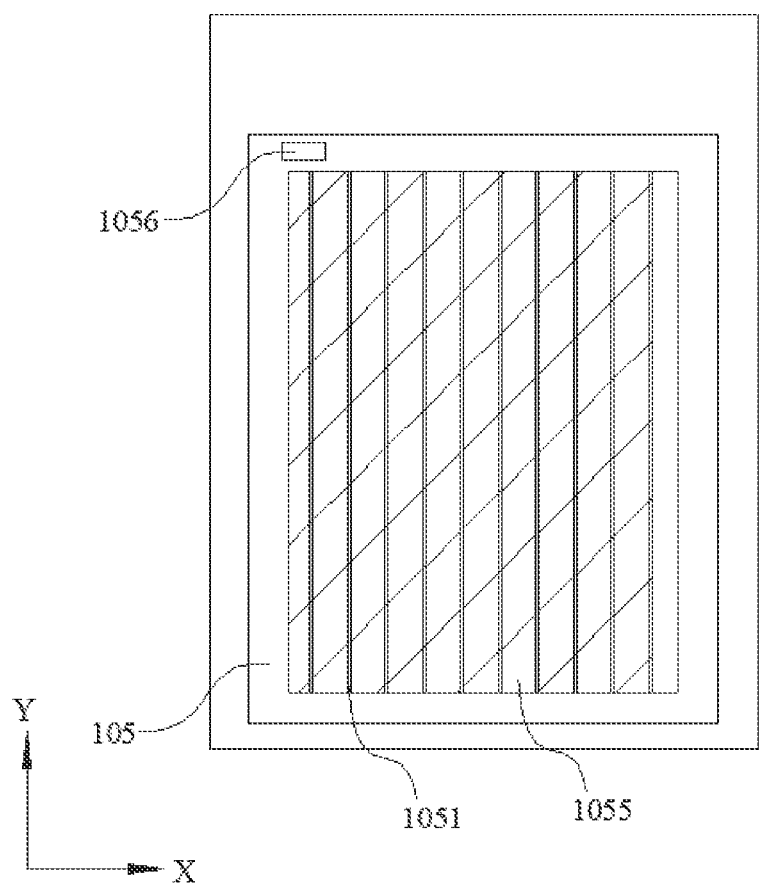
FIG. 3 is a top view of an electrochromic device layer of the embodiment of the present invention.

Of course, to guarantee that the display device is able to switch between the wide view angle mode and the narrow view angle mode, arrangement of the electrochromic devices 1052 can be further optimized. With reference to FIG. 3, FIG. 3 is a top view of an electrochromic device layer of the embodiment of the present invention. The electrochromic device layer 105 comprises a plurality of electrochromic devices 1052, the electrochromic devices 1052 are distributed continuously along a first direction, and are distributed parallelly in a second direction. In the present embodiment, lengths of electrochromic devices 1052 are the same or similar, and are the same as or similar to a length of a displaying region of the display device. The first direction is a direction of a Y-axis shown in the figures, the second direction is a direction of an X-axis shown in the figures. The electrochromic devices 1052 are distributed continuously along the first direction, in other words, the electrochromic devices 1052 on one Y-axis are continuous to form an entirety. Parallel disposing along the second direction means that the electrochromic devices 1052 in different Y-axes are parallel to one another.

Figure 4:
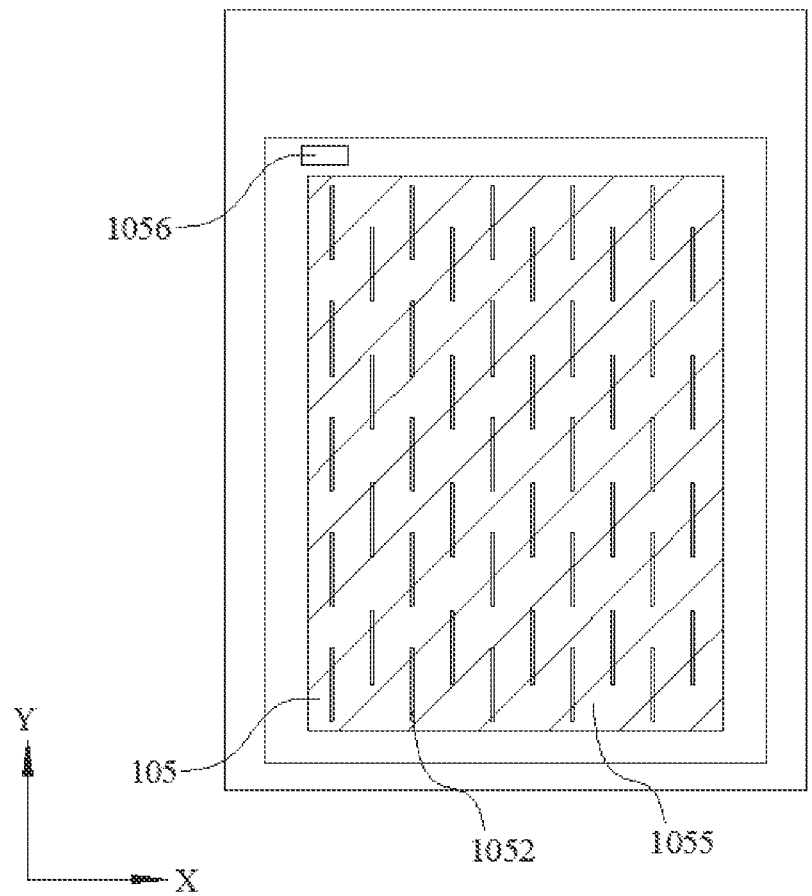
FIG. 4 is a top view of the electrochromic device layer of the embodiment of the present invention.

In another embodiment of the present invention, with reference to FIG. 4, FIG. 4 is a top view of the electrochromic device layer of the embodiment of the present invention. The electrochromic device layer 105 comprises a plurality of electrochromic devices 1052, the electrochromic devices 1052 are distributed along a first direction at intervals, and are distributed parallelly along a second direction. In the present embodiment, a length of each of the electrochromic devices 1052 is far less than an edge of the displaying region of the display device. The first direction is a direction of a Y-axis shown in the figures, and the second direction is a direction of an X-axis shown in the figures. The electrochromic devices 1052 are distributed along the first direction at intervals, in other words, the electrochromic devices 1052 are disposed along one Y-axis, and an interval is defined between adjacent two of the electrochromic devices 1052. Parallel distribution along the second direction means that, the electrochromic devices 1052 along different Y-axes are parallel to one another. Furthermore, the electrochromic devices 1052 along different Y-axes are staggered, in other words, in adjacent two rows of the strip-like device along the second direction, one row of the strip-like device at least partially shields a gap of another row of the strip-like device.

In the embodiment of the present invention, the electrochromic light emitting device layer 105 comprises at least two different statuses of transmittances. Transmittance at least comprises a transmittance T1 of a first transmittance status and a transmittance T2 of a second transmittance status, wherein T1 is greater than T2. Preferably, the transmittance T1 of the first transmittance status is greater than 70%, the transmittance T2 of the second transmittance status is less than 40%. It is worth mentioning that the electrochromic device layer 105 can only comprise two statuses of transmittances or the transmittance thereof can be continuously adjustable in a range of 20%-80% according to demands.

Preferably, to achieve a continuously adjustable transmittance of the electrochromic device layer 105 in a range of 20%-80%, a material of the electrochromic devices 1052 is an electrochromic material. Preferably, a material of the third electrode is at least one of two dimensional materials of molybdenum diselenide ($Mose_2$), tungsten trioxide ($WO_3$), nickel oxide (NiO) or titanium dioxide ($TiO_2$). The electrochromic material can be manufactured by a sputtering coating method, an evaporation coating method, or a chemical vapor deposition method.

Figure 5:
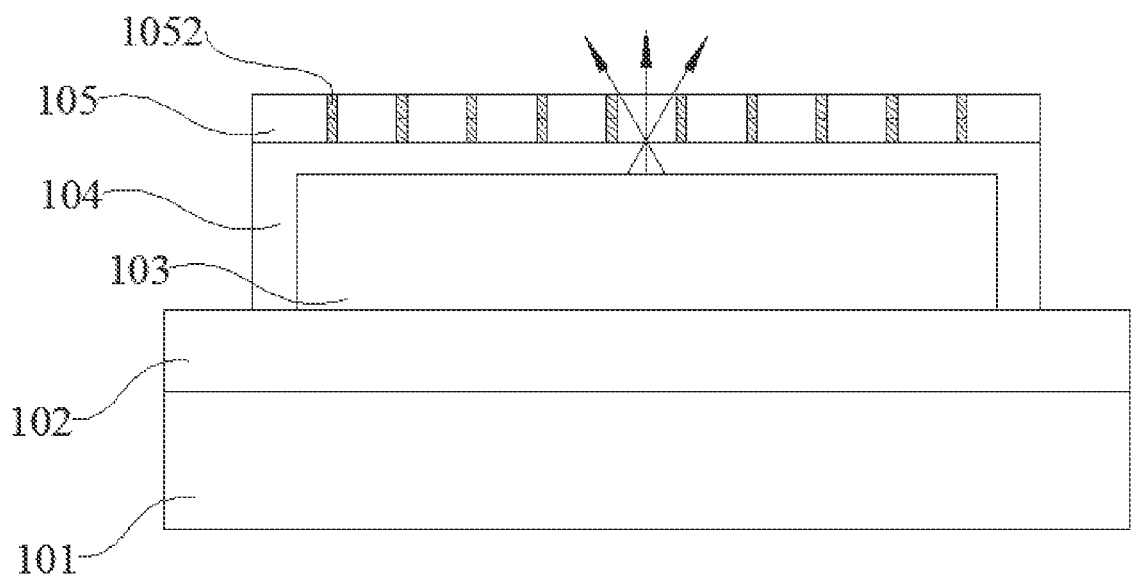
FIG. 5 is a schematic structural view of a display device of the embodiment of the present invention.

The display device comprises a wide view angle mode and a narrow view angle mode. When the display device is in the wide view angle mode, with reference to FIG. 1, the electrochromic device layer 105 is set in the first transmittance status, in the meantime, the transmittance of the electrochromic device layer 105 is higher, the transmittance is T1, more light emitted by the light emitting device layer 103 passes through the electrochromic device layer 105 and extends out to achieve wide view angle display in normal display. When the display device is in a narrow view angle mode, with reference to FIG. 5, FIG. 5 is a schematic structural view of a display device of the embodiment of the present invention. The electrochromic device layer 105 is set in the second transmittance status, in the meantime, the transmittance of the electrochromic device layer 105 is lower, and reflectivity thereof is also lower. The transmittance is T2, less light emitted by the light emitting device layer 103 passes through the electrochromic device layer 105 and extends out, and only emitted light fulfilling a specific range of angle can pass through the electrochromic device layer 105 such that a viewing angle is reduced to achieve privacy protection. It is worth mentioning that "higher", "lower", "more", "less" herein are descriptions comparing the first transmittance status to the second transmittance status.

In the embodiment of the present invention, interval and height of the electrochromic devices 1052 is not limited, the interval and height can be controlled by the viewing angle required in the narrow view angle mode. Preferably, a width of each of the electrochromic devices 1052 is less or equal to 100 μm, which guarantees that display effect would not be influenced when upright viewing.

To better acquire the display device of the embodiment of the present invention, one the basis of the display device, the embodiment of the present invention also provides a display device manufacturing method, the display device manufacturing method is configured to manufacture the display device of the above embodiment.

Figure 6:
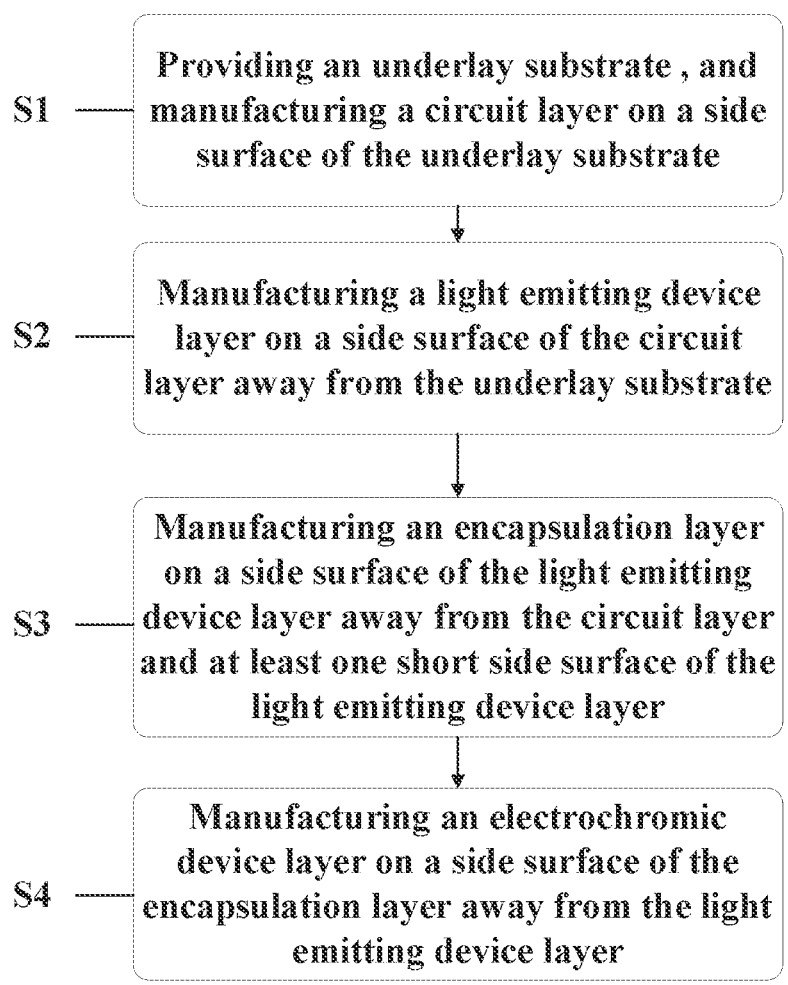
FIG. 6 is a flowchart of a display device manufacturing method of the embodiment of the present invention.

With reference to FIG. 6, FIG. 6 is a flowchart of a display device manufacturing method of the embodiment of the present invention. The display device manufacturing method comprises steps as follows:

A step S1 comprises providing an underlay substrate 101, and manufacturing a circuit layer 102 on a side surface of the underlay substrate 101.

A step S2 comprises manufacturing a light emitting device layer 103 on a side surface of the circuit layer 102 away from the underlay substrate 101.

A step S3 comprises manufacturing an encapsulation layer 104 on a side surface of the light emitting device layer 103 away from the circuit layer 102 and at least one short side surface of the light emitting device layer 103.

A step S4 comprises manufacturing an electrochromic device layer 105 on a side surface of the encapsulation layer 104 away from the light emitting device layer 103.

Figure 7:
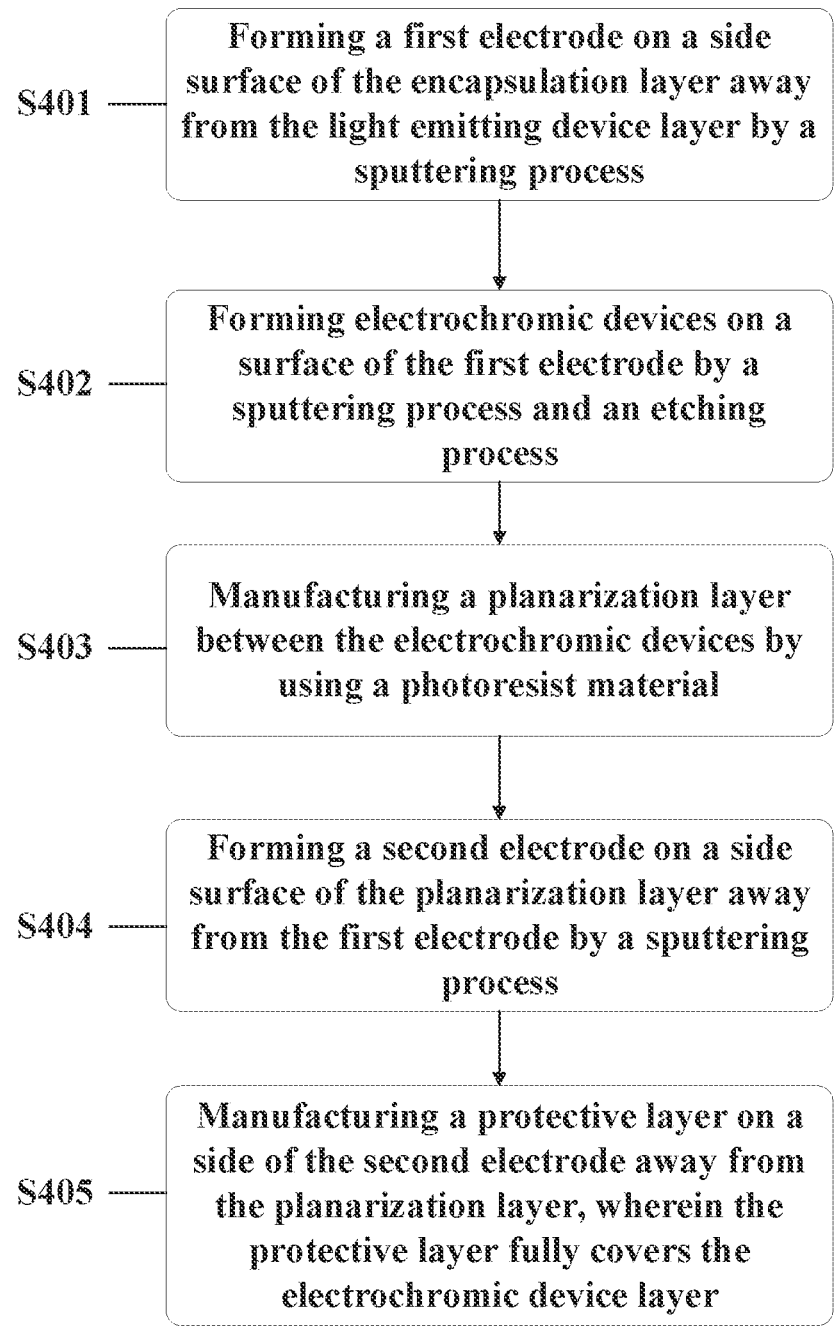
FIG. 7 is a flowchart of an electrochromic device layer manufacturing method of the embodiment of the present invention.

Specifically, with reference to FIG. 7, FIG. 7 is a flowchart of an electrochromic device layer manufacturing method of the embodiment of the present invention. The step S4 of manufacturing the electrochromic device layer 105 comprises steps as follows:

A step S401 comprises forming a first electrode 1051 on a side surface of the encapsulation layer 104 away from the light emitting device layer 103 by a sputtering process.

A step S402 comprises forming electrochromic devices 1052 on a surface of the first electrode 1051 by a sputtering process and an etching process.

A step S403 comprises manufacturing a planarization layer 1053 between the electrochromic devices 1052 by using a photoresist material.

A step S404 comprises forming a second electrode 1054 on a side surface of the planarization layer 1053 away from the first electrode 1051 by a sputtering process.

A step S405 comprises manufacturing a protective layer 1055 on a side of the second electrode 1054 away from the planarization layer 1053, wherein the protective layer 1055 fully covers the electrochromic device layer 105.

In the above-mentioned embodiments, the descriptions of the various embodiments are focused. For the details of the embodiments not described, reference may be made to the related descriptions of the other embodiments. In specific implementation, each of the above units or structures may be implemented as a separate entity, or may be any combination, and implemented as the same entity or a plurality of entities. The specific implementation of the above units or structures refer to the previous method embodiment and will not be described repeatedly.

The embodiment of the present invention are described in details as above. In the specification, the specific examples are used to explain the principle and embodiment of the present invention. The above description of the embodiments is only used to help understand the method of the present invention and its spiritual idea. Meanwhile, for those skilled in the art, according to the present the idea of invention, changes will be made in specific embodiment and application. In summary, the contents of this specification should not be construed as limiting the present invention.

What is claimed is:

1. A display device, comprising:
   an underlay substrate;
   a circuit layer disposed on a side surface of the underlay substrate;
   a light emitting device layer disposed on a side surface of the circuit layer away from the underlay substrate;
   an encapsulation layer covering a side surface of the light emitting device layer away from the circuit layer and at least one short side surface of the light emitting device layer; and
   an electrochromic device layer disposed on a side surface of the encapsulation layer away from the light emitting device layer;
   wherein the electrochromic device layer comprises a first electrode, electrochromic devices, and a second electrode, the electrochromic devices are electrically connected to the first electrode and the second electrode;
   wherein the electrochromic device layer comprises a plurality of electrochromic devices, the electrochromic devices extend along a first direction, and are distributed parallelly along a second direction;

wherein the electrochromic devices are distributed along the first direction at intervals in a plurality of columns, and the electrode devices in adjacent two of the columns are staggered.

2. The display device as claimed in claim 1, wherein the electrochromic device layer further comprises a planarization layer and a protective layer, the electrochromic devices and the planarization layer are disposed on a side surface of the first electrode away from the encapsulation layer, the second electrode is disposed on a side surface of the planarization layer away from the first electrode, and the protective layer is disposed on a side of the second electrode away from the planarization layer and fully covers the electrochromic device layer.

3. The display device as claimed in claim 1, wherein the electrochromic devices are distributed continuously along the first direction.

4. The display device as claimed in claim 1, wherein each of the electrochromic devices comprises at least two different statuses of transmittances, the transmittances at least comprise a transmittance T1 and a transmittance T2, wherein T1 is greater than T2.

5. The display device as claimed in claim 4, wherein the display device comprises a wide view angle mode and a narrow view angle mode, when the display device is in the wide view angle mode, the transmittance of the electrochromic devices is T1, and when the display device is in the narrow view angle mode, the transmittance of the electrochromic devices is T2.

6. The display device as claimed in claim 1, wherein a width of each of the electrochromic devices is less than or equal to 100 μm.

7. A display device manufacturing method, comprising:
providing an underlay substrate, and manufacturing a circuit layer on a side surface of the underlay substrate;
manufacturing a light emitting device layer on a side surface of the circuit layer away from the underlay substrate;
manufacturing an encapsulation layer on a side surface of the light emitting device layer away from the circuit layer and at least one short side surface of the light emitting device layer; and
manufacturing an electrochromic device layer on a side surface of the encapsulation layer away from the light emitting device layer to obtain the display device;
wherein the electrochromic device layer comprises a first electrode, electrochromic devices, and a second electrode, the electrochromic devices are electrically connected to the first electrode and the second electrode;
wherein the electrochromic device layer comprises a plurality of electrochromic devices, the electrochromic devices extend along a first direction, and are distributed parallelly along a second direction;
wherein the electrochromic devices are distributed along the first direction at intervals in a plurality of columns, and the electrode devices in adjacent two of the columns are staggered.

8. The manufacturing method as claimed in claim 7, wherein the electrochromic device layer further comprises a planarization layer and a protective layer, the electrochromic devices and the planarization layer are disposed on a side surface of the first electrode away from the encapsulation layer, the second electrode is disposed on a side surface of the planarization layer away from the first electrode, and the protective layer is disposed on a side of the second electrode away from the planarization layer and fully covers the electrochromic device layer.

9. The manufacturing method as claimed in claim 8, wherein the step of manufacturing the electrochromic device layer comprises:
forming a first electrode on a side surface of the encapsulation layer away from the light emitting device layer by a sputtering process;
forming electrochromic devices on a surface of the first electrode by a sputtering process and an etching process;
manufacturing a planarization layer among the electrochromic devices by using a photoresist material;
forming a second electrode on a side surface of the planarization layer away from the first electrode by a sputtering process; and
manufacturing a protective layer on a side of the second electrode away from the planarization layer, wherein the protective layer fully covers the electrochromic device layer.

10. The manufacturing method as claimed in claim 7, wherein the electrochromic devices are distributed continuously along the first direction.

11. The manufacturing method as claimed in claim 7, wherein each of the electrochromic devices comprises at least two different statuses of transmittances, the transmittances at least comprise T1 and T2, wherein T1 is greater than T2.

12. The manufacturing method as claimed in claim 11, wherein the display device comprises a wide view angle mode and a narrow view angle mode, when the display device is in the wide view angle mode, the transmittance of the electrochromic devices is T1, and when the display device is in the narrow view angle mode, the transmittance of the electrochromic devices is T2.

13. The manufacturing method as claimed in claim 7, wherein a width of each of the electrochromic devices is less than or equal to 100 μm.

* * * * *